(12) United States Patent
Woodworth et al.

(10) Patent No.: US 7,961,212 B2
(45) Date of Patent: Jun. 14, 2011

(54) VIDEO MESSAGING SYSTEM

(75) Inventors: Brian R. Woodworth, Irving, TX (US);
Enrique Ruiz-Velasco, Flower Mound, TX (US); Shadman Zafar, Coppell, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 1339 days.

(21) Appl. No.: 11/503,292

(22) Filed: Aug. 14, 2006
(Under 37 CFR 1.47)

(65) Prior Publication Data
US 2008/0062246 A1 Mar. 13, 2008

(51) Int. Cl.
*H04N 7/14* (2006.01)
(52) U.S. Cl. ............... 348/14.01; 348/14.02; 348/14.06; 455/412.1; 709/206
(58) Field of Classification Search .... 348/14.01–14.16; 709/204–207; 455/413, 412.1
See application file for complete search history.

(56) References Cited

U.S. PATENT DOCUMENTS

| | | | | |
|---|---|---|---|---|
| 2001/0032246 A1* | 10/2001 | Fardella et al. | ............... | 709/206 |
| 2002/0098831 A1* | 7/2002 | Castell et al. | ................. | 455/413 |
| 2004/0014456 A1* | 1/2004 | Vnnen | ........................... | 455/413 |
| 2005/0283813 A1* | 12/2005 | Jamail et al. | .................. | 725/109 |
| 2007/0067407 A1* | 3/2007 | Bettis et al. | .................... | 709/207 |

FOREIGN PATENT DOCUMENTS
JP 07170506 A * 7/1995

OTHER PUBLICATIONS

Budde, Paul, "Internet Technology—Streaming Media", copyright 2002 BuddeComm, Printed from Verizon.com Learning Center on Jun. 8, 2005.

* cited by examiner

*Primary Examiner* — Melur Ramakrishnaiah (57) ABSTRACT

Systems and methods provide a video messaging service for transmitting video messages between network terminals over a network. After a caller's video-messaging terminal receives a notification that a receiver failed to respond to a communication request, the caller's video-messaging terminal may enable the caller to record a video message and store it for viewing on-demand by a receiver's video-messaging terminal. After recording, the caller's video-messaging terminal transmits a stored message notification terminal to a network server which, in turn, transmits a stored message notification, including an identifier of the caller's video-messaging terminal, to the receiver. Based on the identifier, the receiver's video-messaging terminal may request access to the video message from the caller's video-messaging terminal. In response to the request, the caller's video-messaging terminal retrieves the video message from storage and provides it to the receiver's video-messaging terminal over the network.

22 Claims, 7 Drawing Sheets

FIG. 7 ly used. For example, in a typical voice messaging service (a.k.a., "voice mail"), when a phone call goes unanswered, the voice messaging service routes the call to a voice response system that records an audio message from the caller and allows the intended receiver to retrieve the message at a later time. In basic implementations, voice messaging systems replicate the features of telephone answering machines, providing a recipient the ability to listen, store and erase messages.

VIDEO MESSAGING SYSTEM

BACKGROUND INFORMATION

The increasing availability of high bandwidth data networks enables telecommunication service providers to offer their subscribers enhanced communication services. Of these services, messaging is one of the most widely used. For example, in a typical voice messaging service (a.k.a., "voice mail"), when a phone call goes unanswered, the voice messaging service routes the call to a voice response system that records an audio message from the caller and allows the intended receiver to retrieve the message at a later time. In basic implementations, voice messaging systems replicate the features of telephone answering machines, providing a recipient the ability to listen, store and erase messages.

Some telecommunication service providers offer text-messaging services enabling users to transmit written messages and documents over computer networks. Text messaging services include, for example, electronic mail (i.e., e-mail), text messaging, instant messaging and text paging. In a typical e-mail system, a user composes a text-based message at a first network terminal using an e-mail client software application, addresses the message to one or more recipients and transmits the message over the network to a mail server. The server stores the message and, on-demand, routes the message to the addressed recipients over the network. Video mail (i.e., v-mail) operates similarly to e-mail, but also enables video messages to be included within e-mail messages.

Some service providers offer online photograph-sharing services which enable users to upload digital photographs to a database accessible through an Internet website. After a user uploads photographs to the database, another user may access the photographs via a network terminal. Once accessed, the other user may, for example, download copies the photographs to the user's network terminal. Similarly, other service providers offer on-demand video service enabling users at remote terminals to access motion pictures from a central database accessible from an Internet website. The motion pictures may be transmitted to a user as a complete file or they may be "streamed" to the user's terminal in discrete portions that are presented in near real-time.

Still other service providers offer video communication services, such as video conferencing that allow direct, real-time audiovisual communication between participants in the conference. These services generally require the presence off each participant to accept an invitation and participate in the video conference.

DETAILED DESCRIPTION OF PREFERRED EMBODIMENTS

The following description refers to the accompanying drawings in which the same numbers in different drawings represent similar elements unless otherwise represented. The implementations set forth in the following description of preferred embodiments consistent with the present invention do not represent all implementations consistent with the claimed invention. Instead, they are merely examples of systems and methods consistent with aspects related to the invention as recited in the appended claims.

Methods and systems implementing the preferred embodiments described herein provide a video messaging service enabling users to create, store, receive, and view video messages over telecommunications networks. Video messages are communications of a limited size and/or duration containing audio and video content recorded by a first user (referred to herein as a "caller") and transmitted over a network to one or more other users (referred to herein as "receivers"). The video messaging service may be offered by a telecommunications service provider and may be a stand-alone service or may be bundled with other services offered by the telecommunications provider including, for example, Internet access, telephony, and/or television broadcasting services. Further, the video messaging service may grant access to network-accessible data storage having a storage region allocated to the user.

In the preferred embodiment, the video messaging service enables a caller to create and store video messages for one or more receivers. To facilitate this process, a network-enabled user terminal ("network terminal") connected to the communications network may include devices and/or software for recording, storing, and transmitting video messages over the network. A caller at a first network terminal may request communication with a receiver's network terminal over the network. In the event the request for communication is not accepted by the receiver, the caller's network terminal may offer the caller the option of recording a video message. In response, the caller may record a video message using audio and video input devices operatively connected to the caller's network terminal. After recording the message, the video message is stored for later retrieval by the receiver. In some implementations, the video message is stored at the caller's network terminal until requested by the receiver, at which time, a communications link is established between the caller's and the receiver's network terminals and the video message is transmitted to the receiver's network terminal over the telecommunications network. In alternate implementations, the video message may be stored at a network server from where it may be retrieved by the receiver. In still other implementations, the recorded video message may be transmitted to the second network terminal for storage immediately after recording.

The preferred video messaging service further enables a receiver at a network terminal to access a video message stored by a caller. To facilitate this process, receiver's network terminal may include devices and/or software for accessing, retrieving, displaying, and managing video messages. A receiver's network terminal may receive a notification from a network server of a stored video message. In response, the receiver may access and view the video message through various audio and video output devices operatively connected to the receiver's network terminal. In some implementations, video messages may be retrieved from the caller's network terminal over the network upon demand by the receiver. For instance, based on an identifier contained in the stored video message notification, the receiver's network terminal may establish a communication link with the caller's network terminal and retrieve the message from storage. In alternate implementations, the receiver's network terminal may instead retrieve the video message from storage at a network-connected video messaging server system. In other alternate implementations, the recorded video message may be stored at the receiver's network terminal immediately after recording by the caller.

A video messaging server system facilitates the communication of video messages between a caller and receiver. To facilitate the process, the video messaging server may include devices and/or software for managing user accounts, notifying receivers of messages and message statistics, and/or storing video messages for retrieval. When a receiver does not accept a caller's request for communication, the caller may record a video message for at least one receiver, and transmit a notification of the stored message to the video messaging server. Subsequently, the video messaging server provides a notification of the stored video message to the receiver's network terminal, the notification including an identifier of the caller's network terminal enabling the receiver to locate the caller's network terminal in the network.

In alternative implementations, the video message server receives a video message from the caller's network terminal, stores the video message in association with a receiver account, and transmits a notification of the stored video message to the receiver's network terminal. Subsequently, video messaging server may receive from the receiver's network terminal a request to access the video message and present the video message at the receiver's network terminal for the receiver.

The preferred video messaging system may use computer-readable media that include program instructions and/or data that, when executed by a processor, cause the processor to perform the various operations implemented by the preferred embodiments. The program instructions may be those specially designed and constructed for the purpose of implementing the preferred embodiments described herein, or they may be of the kind well-known and available to artisans in the field of computer software. Examples of program instructions include, for example, machine code such as produced by a compiler, files containing high-level code executable by a computer via an interpreter, or levels of abstraction therebetween.

Figure 1:
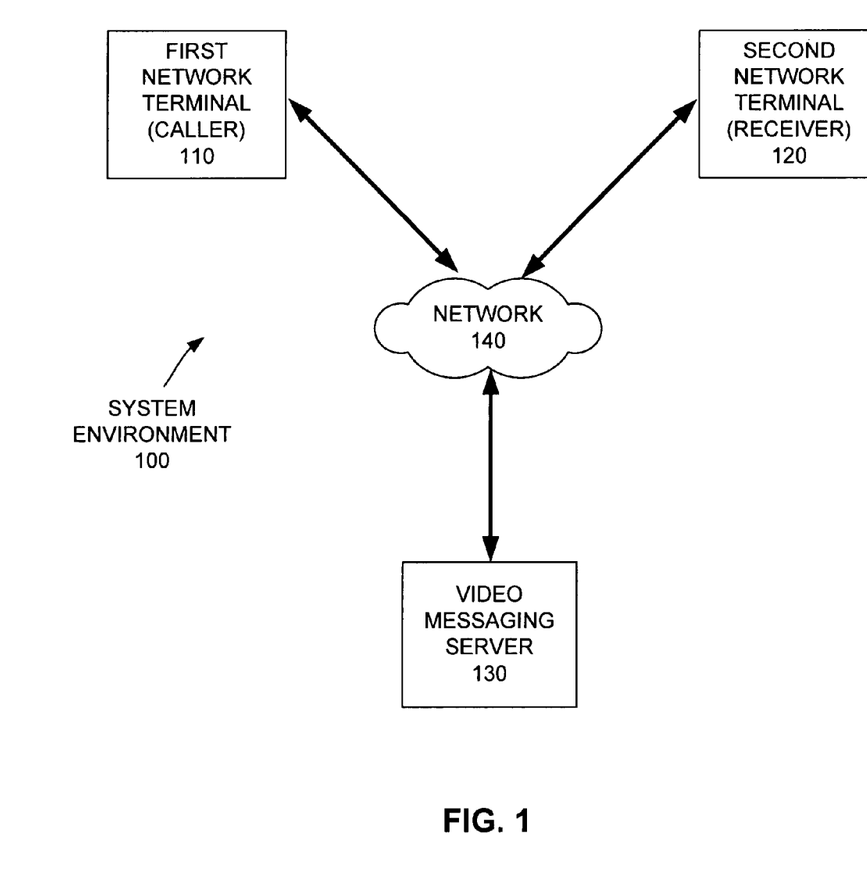
FIG. 1 illustrates a block diagram of an exemplary system environment for implementing embodiments consistent with the present invention.

FIG. 1 provides a block diagram exemplifying a system environment that implements the preferred embodiments. FIG. 1 shows two network terminals 110 and 120 communicatively connected to video messaging server 130 over a network 140. Network terminals 110 and 120 may be one or more data processing systems that perform computer executed processes, including those described below. Network terminals 110 and 120 may include components consistent with computing systems such as processors, memory and input/output devices that enable a user to create, store video messages at network terminals 110 and 120 and/or transmit and receive video messages to/from other network terminals over network 140. Network terminals 110 and 120 may be implemented as one or more generic computer systems including, for example, personal computer, minicomputer, microprocessor, workstation or similar computer platforms typically employed in the art. Alternatively, network terminals 110 and 120 may be embedded within a specialized computing system including, for example, a "set-top box" for receiving broadcast television signals, a video-enabled telephone, a video game console, a mobile telephone, a personal digital assistant, or a portable game device. Network terminals 110 or 120 may be located in a user's home, at a business, in a public kiosk or in a portable device. Furthermore, network terminals 110 and 120 may be a owned by a user or may be provided to the user by a telecommunications service provider in conjunction with video messaging or other services.

Video messaging server 130 may be one or more computer systems including, for example, personal computer, minicomputer, microprocessor, workstation or similar computer platforms typically employed in the art. Consistent with aspects of this invention, video messaging server 130 processes computer-executable instructions and data for facilitating the transfer of video messages between users over network 120. Video messaging server 130 may include, amongst other components, processors, memory, and input/output devices, network interface, and data storage.

Network 140 may be one or more communication networks that communicate information between network terminals 110 and 120, and video messaging server 130. Network 140 may be any type of network for communicating information, including data, text, pictures, voice and video. In some instances, the network 140 possess sufficient bandwidth to transmit video messages in real-time. Network 140 may be a shared, public, private, client-server, or peer-to-peer network encompassing a wide or local area including an extranet, an Intranet, the Internet, a local area network (LAN), wide area network (WAN), the public switched telephone network (PSTN), integrated services digital network (ISDN), radio links, wireless telephone and/or data network, and any other form of wired or wireless communication networks. Network 140 may be compatible with any type of communication protocol used by the components of the system environment to exchange information, such as Ethernet, ATM, SONET, Transmission Control/Internet Protocol (TCP/IP), Hypertext Transfer Protocol (HTTP), Wireless Application Protocol (WAP), the various wireless communication protocols (e.g., GSM, CDMA, EV-DO), or a peer-to-peer protocol. The network provider may be, for instance, an Internet Service Provider (ISP), a wired and/or wireless telephone service provider, a cable television provider, a satellite television provider, an operator of WAN, an operator of LAN, or an operator of a direct-link/person-to-person network.

As illustrated in FIG. 1, system environment 100 includes two network terminals 110 and 120, a single video messaging server 130 and network 140. However, as readily apparent to an artisan, practical embodiments may include a plurality of network terminals 110, 120 and/or video message servers 130 linked over multiple networks 140 by a plurality of network exchange points sharing data between the plurality of networks. Alternatively, network terminals 110 and 120 and video messaging server 130 may be linked over a closed network provided by a single telecommunications network service provider.

Figure 2:
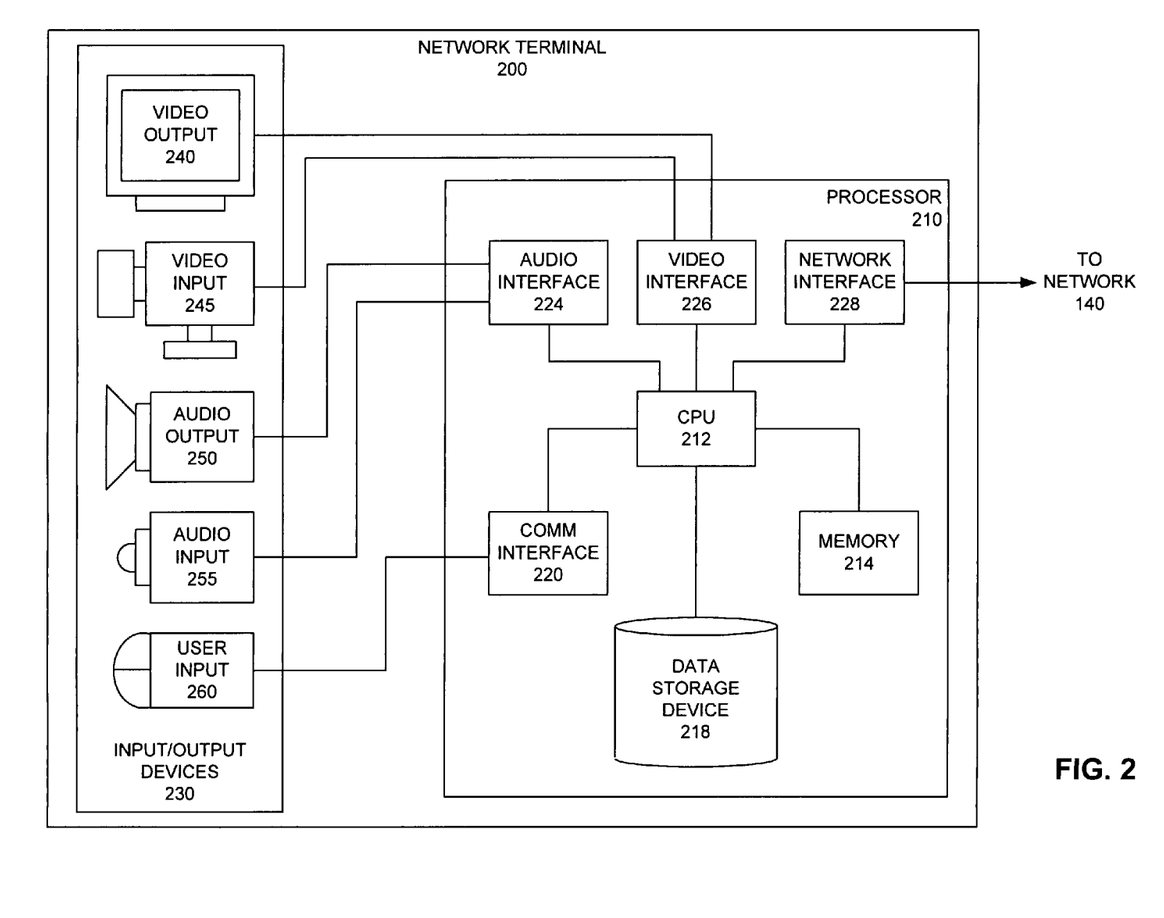
FIG. 2 illustrates a block diagram of an exemplary computerized system environment for a network terminal, consistent with an embodiment of the present invention.

FIG. 2 provides a block diagram exemplifying aspects of network terminals 110 and 120. The exemplary network terminal 200 illustrated in FIG. 2 includes controller 210 and input/output devices 230. Controller 210 may be one or more processing devices that execute computer instructions and data and stored in one or more memory devices. Controller 210 may include, for example, central processing unit (CPU)

212, memory 214, data storage device 218, communications interface 220, clock 222, audio interface 224, video interface 226, and/or network interface 228.

CPU 212 may be any controller such as an off-the-shelf microprocessor (e.g., INTEL PENTIUM) or an application-specific integrate circuit created specifically to adapted for network terminal 200. Memory unit 214 may be one or more memory devices that store data and computer instructions that, when executed by CPU 212, cause the CPU 212 to perform the methods described herein. Memory 214 and data storage device 218 represent memory devices used in computers for storing and executing operating system and application software. Other types of semiconductor and magnetic memories such as electronically erasable programmable read only memory (EEPROM), flash memory, optical disks, and magnetic disks may replace memory devices 214 and 218, in whole or in part.

Audio interface 224 enables information exchange between CPU 212 and audio devices 250 and 255. For instance, audio interface 224 may include an analog-to-digital converter for converting analog audio signals acquired by audio input device 255 into digital data. Similarly, audio interface 224 may include a digital-to-analog converter for converting digital audio data from CPU 212 into analog audio signals for audio output device 250. Furthermore, audio interface 224 may include a CODEC for compressing and/or decompressing the audio data. Although audio interface 224 is described as a hardware device, it may be implemented completely in software, or a combination of hardware and software.

Video interface 226 enables information exchange between CPU 212 and video devices 240 and 245. For instance, video interface 226 may include an analog-to-digital converter for converting analog video signals acquired by video input 245 into digital data. Similarly, video interface 226 may include a digital-to-analog converter for converting digital video data from CPU 212 into analog video signals for video output device 240. Furthermore, video interface 226 may include a CODEC for compressing and/or decompressing video information. Although video interface 224 is described as a hardware device, it may also be implemented completely in software, or a combination of hardware and software.

Communications interface 220 provides one or more interfaces for enabling information exchange between controller 210 and peripherals to terminal 200 devices, including input/output devices 230. Communications interface 220 may be, for example, a serial port (e.g., RS-232, RS-422, universal serial bus, IEEE-1394), parallel port (e.g., IEEE 1284), or wireless port (e.g. infrared, ultraviolet, radio-frequency).

Network interface 228 may be one or more hardware and/or software components configured to send and receive information over network 140. Network interface 228 may support any telecommunications or data network including, for example, PSTN, Ethernet, WiFi, token ring or Fiber Distributed Data Interface. Alternatively, network interface 228 may be an external network interface connected to controller 210 though communications port 220.

Exemplary input/output devices 230 include video output 240, video input 245, audio output 250, audio input 255 and user input 260. Video output 240 may be any device for displaying visual information such as a cathode ray tube (CRT), liquid crystal display (LCD), light emitting diode display (LED), plasma display, or electroluminescent display. Video input device 245 may be analog or digital camera, camcorder, charged coupled device (CCD) camera or other image acquisition device. Audio output device 250 may be a speaker, headphone, earpiece, or other audio transducer that converts electrical signals into audible tones. Audio input 255 device may be a microphone or other audio transducer that converts sounds into electrical signals. User input device 260 may be any conventional device for communicating user's commands to network terminal 200 including, but not limited to, keyboard, keypad, computer mouse, touch screen, trackball, scroll wheel, joystick, television remote controller, or voice recognition controller.

Figure 3:
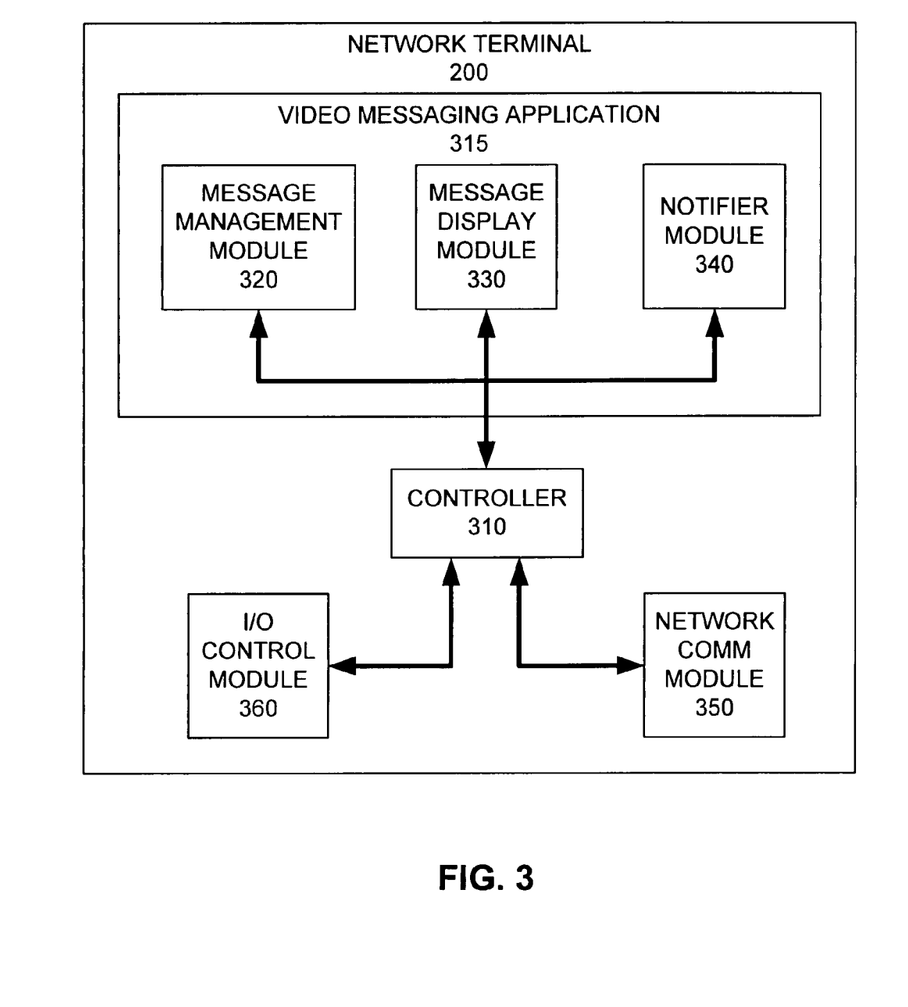
FIG. 3 illustrates a block diagram of an exemplary software environment for a network terminal, consistent with an embodiment of the present invention.

FIG. 3 provides a block diagram exemplifying aspects of network terminal 200 software processes. Software processes may include, for example, software controller 310, video messaging application 315, network communication module 350 and I/O control module 360.

Software controller 310 includes computer-executable instructions for managing the processing and exchange of data between software modules 315-360 and/or hardware devices 214-220 and 240-260. For this purpose, controller 310 may include, for example, an operating system, kernel, system handler, and event handler.

Video messaging application 315 may include message management model 320, message display module 330 and notifier module 340. Message management module 320 includes data and computer-executable instructions for providing an interactive user interface for managing video messages. Similar to an electronic mail client application, message management module 320 may, among other features, enable a user to send, receive, create, view, store, delete, reply, forward, and search stored video messages at user terminal 200. Further, message management module 320 may provide an interactive listing of video messages in association with video message statistics. The listing may include, for example, user names, user identifications, message subjects, time messages were sent, time/date messages were received, priority (e.g., high, normal, low), message size, message duration, message location, indication of whether message had been viewed and/or indication of message attachments, if any. Message management module 320 may further enable users to organize messages into folders having, for example, a common theme or subject. For instance, message folders may be analogous to folders found in an email client, including an "inbox" where new video messages are listed, a "sent" folder where messages transmitted to other users are listed, a "trash" folder where deleted video messages are listed and/or other personal folders created by the user. The messages may be stored locally on network terminals 110 or 120, on video messaging server 130, or other remote network storage device.

Message display module 330 includes computer instructions and data processed by CPU 212 for providing an interactive user interface having user-interactive controls for playing, recording, rewinding, reviewing, cueing, fast-forwarding, and pausing a video message. In response to caller's selection to record a video message, message display module 330 may, through input/output devices 230, record a video message using video input device 245 and audio input device 255, and store message on data storage device 218. Further, a caller or receiver may view the recording in real-time through video output 240 and audio output 250. In some implementations, message display module 330 may be a third-party media viewer such as WINDOWS MEDIA PLAYER by Microsoft Corporation, or QUICK TIME PLAYER by Apple Computer, Inc.

Notifier module 340 may execute instructions for sending and receiving notifications between network terminals 110 and 120 and video messaging server 130 over network 140. In one aspect, when a caller creates and stores a video message at network terminal 110, notifier module 340 may transmit notification of the stored message to receiver's terminal 120 and/or video messaging server 130. Conversely, in the event video messaging server 130 transmits notification of the stored message to receiver terminal 120, notifier module 340 may receive the notification and generate a corresponding indication at receiver terminal 120 through audio output device 250 and/or video output device 240.

Network communication module 350 may execute instructions to facilitate communications over network 140. For example, network communication module may include typical networking components to facilitate network communications (e.g., an IP protocol "stack", a layer 2 adaption module, etc.). I/O control module 360 may execute instructions to facilitate communications between peripheral devices attached to or integrated with network terminal 200. For example, I/O control module may include typical I/O components to facilitate communications over an I/O interface (e.g., USB drivers, "plug-and-play" functionality, bus mediation, etc.).

Although disclosed as being resident on network terminal 200, modules 315-340 may instead reside on a remote server, such as video messaging server 130, which may incorporate the functionality modules 315-340. For example, rather than executing video messaging application 315 at terminals 110 and 120, terminals 110 and 120 may access an Internet web page executed by video messaging server 130 offering equivalent functions.

The configuration or relationship of components illustrated in FIGS. 1-3 is exemplary. For example, components of network terminal 200 may be independent components operatively connected or, alternatively, they may be combined within a single component including the functions of some or all of the components. For example, input/output devices 230 may be a plurality of independent devices within separate housings detachably connected to a generic controller, such as a personal computer or set-top box. In other implementations, controller 210 and input/output devices 230 may be integrated within a single housing such as a mobile telephone. One of ordinary skill in the art may select different configurations of components based on the requirements of a particular implementation of a network terminal giving consideration to factors including, but not limited to, cost, size, speed, form factor, capacity, portability, power consumption and reliability.

Figure 4:
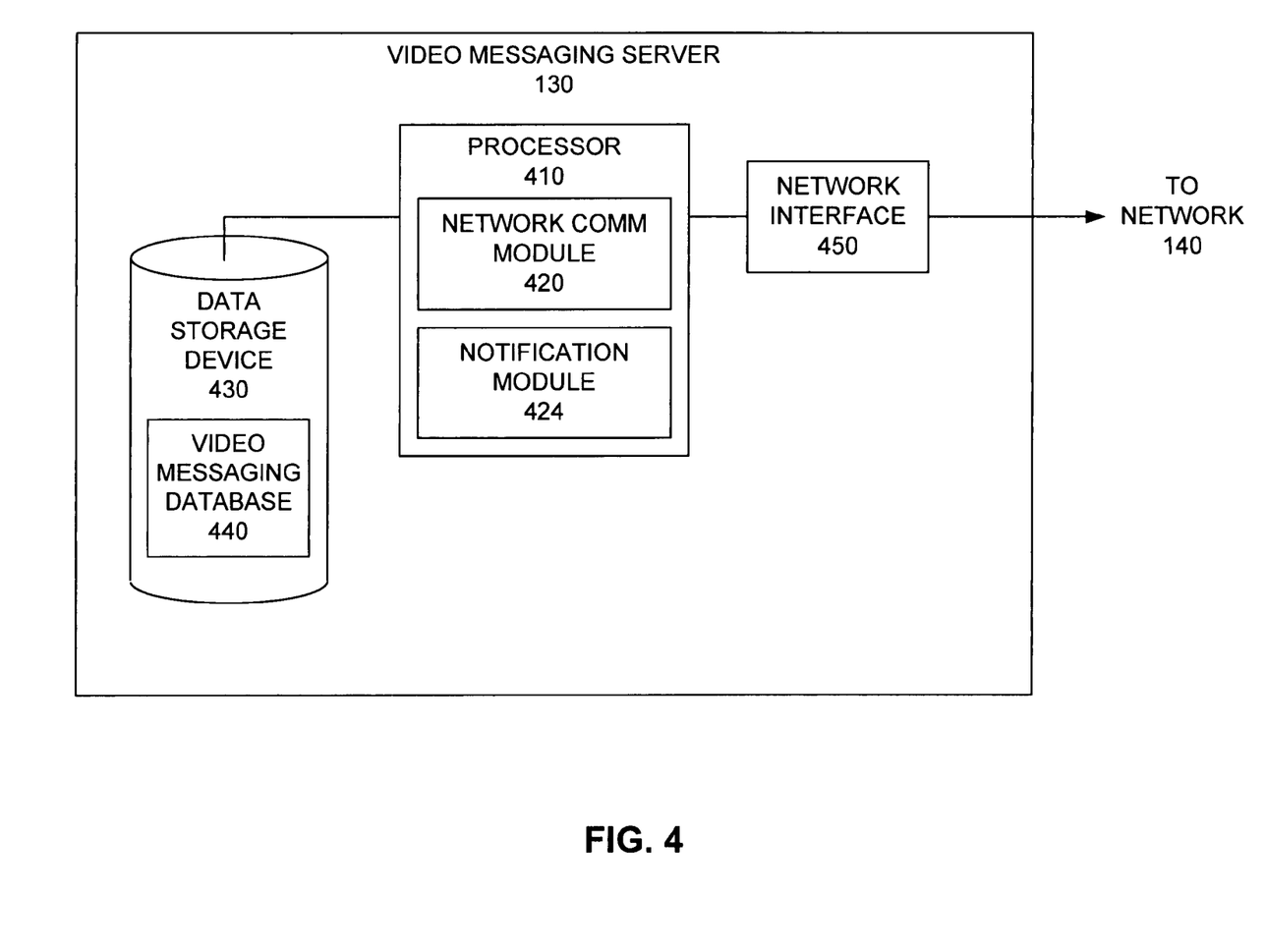
FIG. 4 illustrates a block diagram of an exemplary computerized system environment for a network server, consistent with an embodiment of the present invention.

FIG. 4 provides an exemplary block diagram of video messaging server 130 which may be one or more processing devices that execute software modules 420-426 stored in one or more memory devices 430 to provide various functions implemented by the preferred embodiments described herein. Video messaging server 130 may include one or more generic computer systems including, for example, a personal computer, minicomputer, microprocessor, workstation or similar computer platforms typically employed in the art. Video messaging server 130 may include processor 410, data storage device 430 and network interface 450.

Processor 410 may be comprised of one or more CPUs and memory for executing and storing data and instructions. The CPU may be any conventional controller such as off-the-shelf microprocessor (e.g., INTEL PENTIUM); or an application-specific integrate circuit created specifically to adapted for video messaging server. The CPU may process instructions and data stored in computer memory. The memory may be one or more memory devices that store data, operating system and software modules that, when executed by processor 410, performs processes implementing the preferred embodiments described herein. These memory devices may include semiconductor and magnetic memories such as random access memory (RAM), read-only memory (ROM), EEPROM, flash memory, optical disks, magnetic disks, etc.

Data storage device 430 may be one or more memory devices to store data and/or executable instructions used by video messaging server 130. Data storage device may also be used to store video messaging database 440 (described below). Data storage device 430 may alternatively be located external to video message server 130 and accessible through network 140. Network interface 450 may provide typical interfacing facilities to allow communications between server 130 and network 140.

Video messaging database 440 includes information associating a user with network terminal identifier. For instance, database 440 may associate each user with a telephone number, internet protocol address, uniform resource locator or some other unique identifier enabling the user's network terminal 110 or 120 to be located within network 140. Video messaging database 440 may additionally store video messages in association with a user and/or network terminals 110 or 120. In particular, each user may be allocated a portion of video messaging database 440, for storing video messages. When a caller records a video message for a receiver, caller's network terminal 110 may transmit the video message to video messaging database 440 for storage until retrieved by receiver's network terminal 120. In this instance, the video message may be stored in a portion of video messaging database 440 allocated to the receiver. In association with the video message, video messaging database 440 may store a plurality of message statistics.

As further illustrated in FIG. 4, video messaging server 130 may execute software processes 420-424 for facilitating the transfer of video messages between first network terminal 110 and second network terminal 120. In addition to an operating system and/or software applications known in the art, processor 410 may execute a network communication module 420 and notification module 424.

Network communication module 420 may further provide functionality for receiving traffic over network 170 from user terminals 110 and 120. For example, web server module 420 may be a standard Hypertext Transfer Protocol (HTTP) server that a user may access using a web browser program, such as Microsoft's Internet Explorer. In addition, network communication module 420 may include typical networking components to facilitate network communications (e.g., an IP protocol "stack", a layer 2 adaptation module, etc.).

Notification module 424 may execute instructions for sending and receiving notification of stored video messages between network terminals 110 and 120. For instance, notification module 424 may receive from network communication module 420 caller terminal's 110 notification of a stored video message from network communications module 424. Notification module may store caller's notification data on, for example, data storage device 430, in video messaging database 440. Likewise, notification module 424 may access notification data stored in video messaging database 440 for providing a notification of a video message to network communication module 420 for transmission to second user terminal 120 over network 140.

Figure 5:
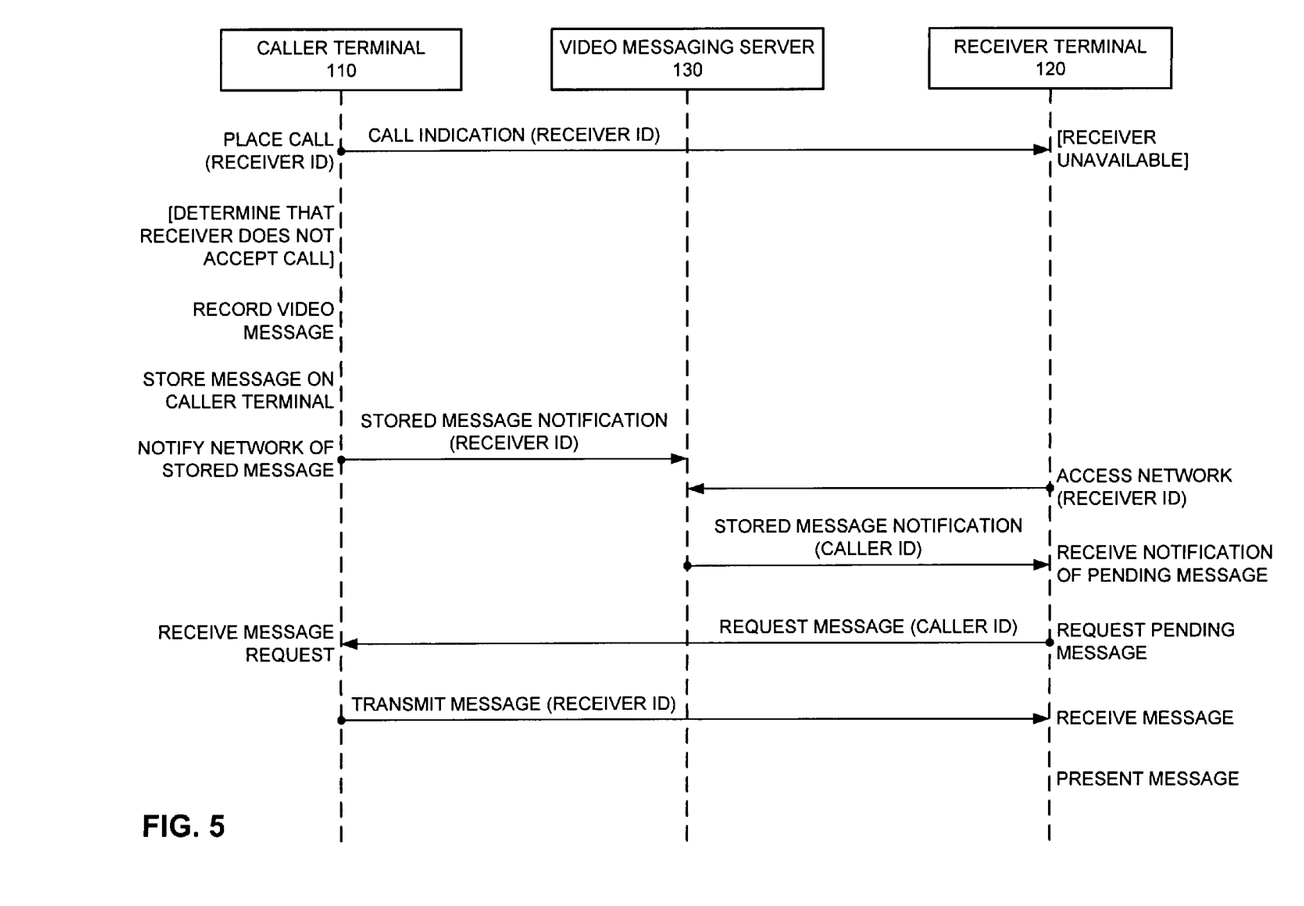
FIG. 5 illustrates an exemplary time flow of a video messaging process, consistent with an embodiment of the invention.
Figure 6:
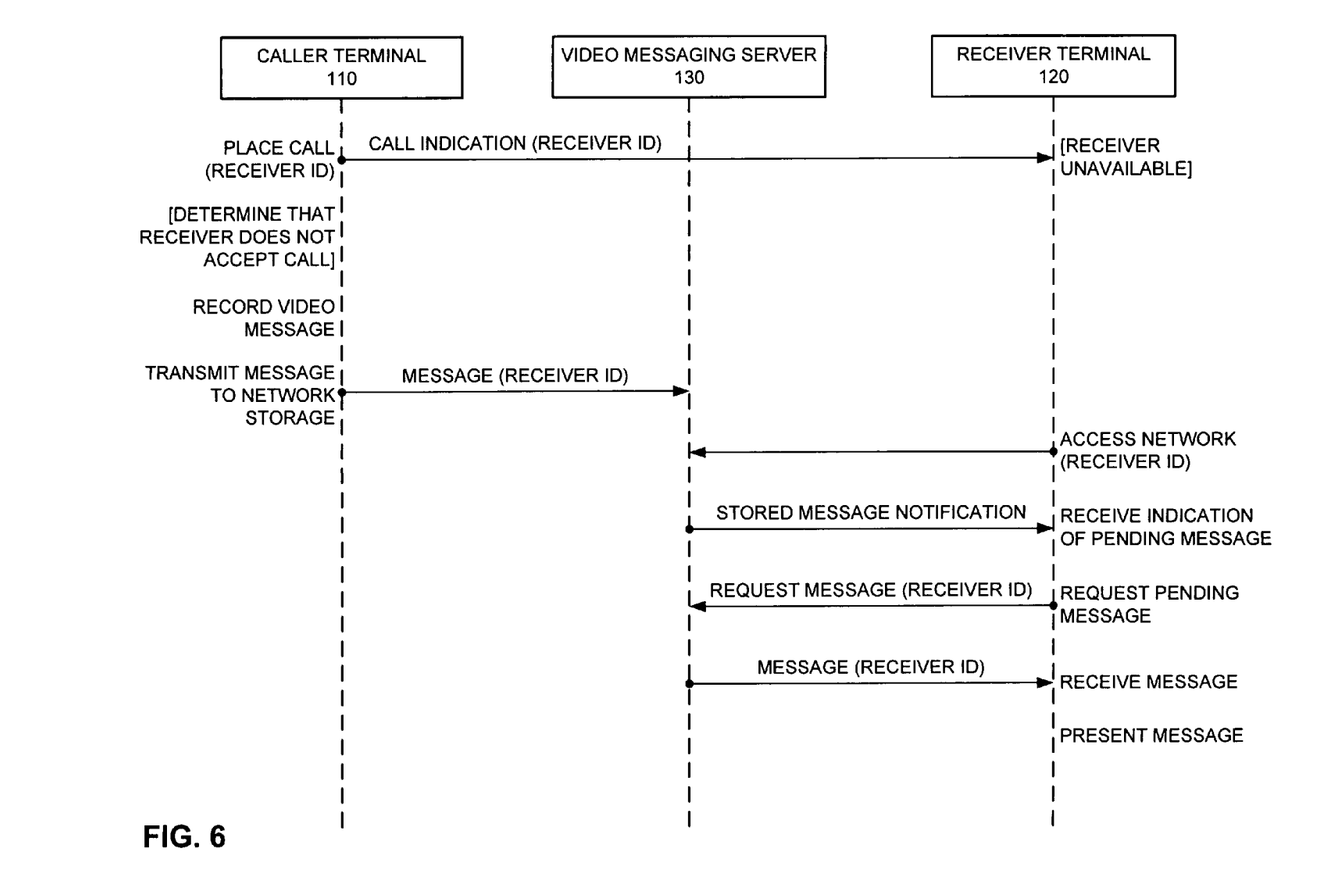
FIG. 6 illustrates an exemplary time flow of a video messaging process, consistent with another embodiment of the invention.
Figure 7:
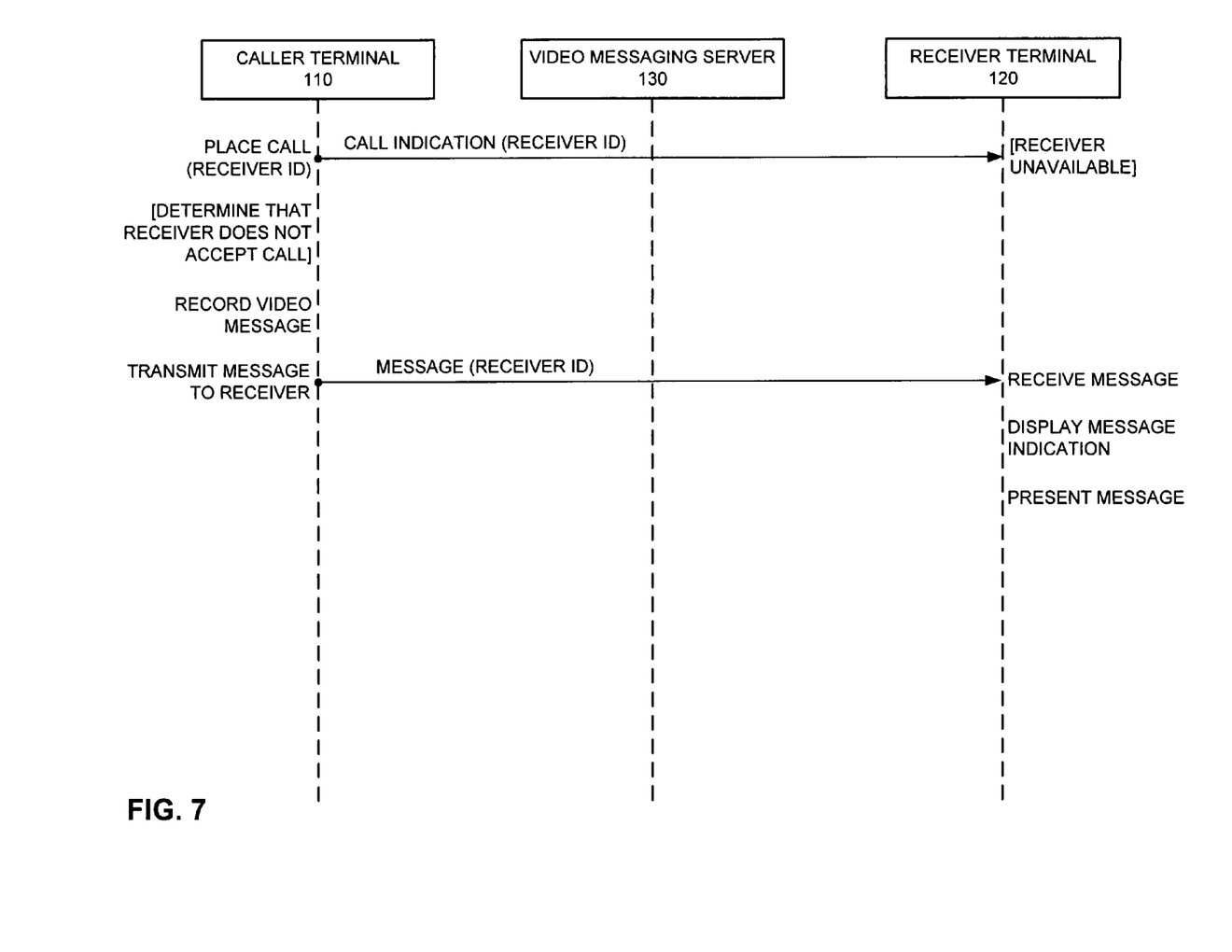
FIG. 7 illustrates an exemplary time flow of a video messaging process, consistent with yet another embodiment of the invention.

FIGS. 5-7 contain sequence diagrams exemplifying the interaction of users with the preferred systems and methods described herein. FIG. 5 illustrates a first exemplary implementation. Initially a caller attempts to communicate with a receiver. The caller accesses network 140 through caller's network terminal 110 and requests communication with the receiver at second network terminal 110. For instance, caller may enter receiver's telephone number, uniform resource locator, Internet Protocol address, or other identifier of receiver's network terminal 120. However, in accordance with this example, the receiver does not respond to the caller's request for communication. After determining that the receiver has not accepted caller's communication request, caller's network terminal 110, executing video messaging application 315, offers the caller the option to record a video message for one or more receivers. If the caller chooses, he/she may record a video message using input/output devices 230 of network terminal 110 as executed by message management module 320. After the caller finishes recording the video message, the video message is stored on caller's network terminal 110 in, for example, data storage device 218

Once the video message is stored, notification module 340 provides notification of the stored message to video messaging server 130. In response, video messaging server 130 updates receiver's account file stored in video messaging database 440 with an indication that that receiver has a pending message.

Subsequently, when the receiver accesses network 140, for example, receiver's network terminal 120 may check receiver's account in video messaging database 440 on video messaging server 130 for message notifications. The check for stored messages may occur automatically when receiver's network terminal 120 obtains access to network 140, periodically, or selectively in response to receiver's request. Alternatively, message notifications may be "pushed" to network terminal 120 by messaging server 130 at periodic intervals, or upon the occurrence of some event.

If video messaging database 440 indicates a stored message for receiver, video messaging server 130 notification module 424 transmits a notification to receiver's network terminal 120. The notification may include message information including, for example, the caller's name, subject, date and time sent, size, priority, sensitivity, and names of other recipients. The notification may be provided based on receiver's network terminal identifier. Upon receipt of the notification, the receiver's network terminal 120 may cause an audio and/or video indication to be output through input/output devices 230 to communicate notice of a pending video message and associated message information. After receiving this indication, the receiver may command network terminal 120 to access the video message. In response, based on the caller's network terminal 110 identifier provided in the stored message notification, receiver's network terminal 120 may access caller's network terminal 110 and request transmission of the stored video message. This request may be made directly to caller's network terminal 110 or may be passed through video message server 130. In response to the request, caller terminal 110 retrieves the video message from data storage device 218 and transmits the message to receiver's network terminal 120. The transmission may be performed over a direct link to receiver terminal 120 (e.g., peer-to-peer network connection), routed through video messaging server 130, or, alternatively, through a separate telecommunication link.

In some implementations, the video message may be transmitted and presented in "real-time" such that the frames of video are presented at receiver's terminal 120 at the same rate they are received with little or no perceptible delay between frames by a viewer (e.g., 30 frames per second or faster). Alternatively, the video message may be "streamed" to receiver in discrete, viewable portions and presented by network terminal 120 as it is received (allowing for buffering to mask network congestion delays). Further, the video message may be "downloaded" as a single file that is received by network terminal 120 as a whole, stored in storage device 218 and presented automatically, or upon receiver's demand.

FIG. 6 illustrates a second exemplary interaction between a caller and a receiver. The second example functions similarly to the first, however, video messages may instead be stored by the video messaging server 130 in video messaging database 440. More specifically, after the caller determines that the receiver is unavailable for a connection and records a video message, caller's network terminal 110 transmits the video message (and any related message information) to video messaging server 130 which receives the message and stores it in video messaging database 440 in association with receiver's account. Video message server 130 then transmits a stored message notification to receiver's network terminal 120. For example, when the receiver accesses network 140, receiver's network terminal 120 may check receiver's account in video messaging database 440 on video messaging server 130 for message notifications. The check for stored messages may occur automatically upon access by network terminal 120 to network 140, periodically, or, selectively in response to the receiver's request. Alternatively, message notifications may be "pushed" to network terminal 120 by messaging server 130 at periodic intervals, or upon the occurrence of some event.

After receiving a notification, the receiver may command network terminal 120 to retrieve the stored video message. In response, video messaging server 130 may retrieve the video message from video message database 440 and transmit the message to receiver's network terminal 120. In some implementations, the video message may be transmitted and presented in "real time," for example, the message may be streamed to receiver terminal 120. The message may alternatively be sent as a single file that is received by second network terminal 120 as a whole, and stored in storage device 218.

FIG. 7 illustrates a third exemplary interaction between and call and a receiver. The third example functions similarly to the first and second, however in this third example, video messages are stored by receiver's network terminal 120 immediately after being recorded at receiver's network terminal 120. More specifically, after the caller's network terminal determines that the receiver is unavailable and caller records a video message, network terminal 110 may transmit the message (and any related message information) to second network terminal 120 over network 140 based on the receiver's network terminal identifier. The transmission may be performed over a direct link to receiver 120 (e.g., peer-to-peer network connection) or may be routed through video messaging server 130, if desired, through a separate telecommunication link. Alternatively, if its is determined that network terminal 120 is not connected to network 140, network terminal 110 may then store the video message locally at network terminal 110 (as in the first example) or at video message server 130 (as in the second example), as described previously. Upon reception, second network terminal 120 stores the message in its storage device 218. The message may then be displayed either automatically, or upon receiver input to network terminal 120.

Any of the steps of the sequences illustrated in FIGS. 5-7 and described above are subject to authentication by user identification, keyword and/or a cryptographic key. For example, user verification and/or authorization may be required before accessing network terminals 110 and 120, accessing network 140, and/or video messaging server 130. Furthermore, data stored in memory, storage devices and/or contained in video messages may be encrypted.

The preferred embodiments described above are provided for purposes of exemplary illustration. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments. Such environments and related applications may be specifically constructed for performing the various processes and operations of the claimed invention or they may include a general purpose computer or computing platform selectively activated or reconfigured by program code to provide the necessary functionality. The processes disclosed herein is not inherently related to any particular computer or other apparatus, and may be implemented by a suitable combination of hardware, software and/or firmware. For example, various general purpose data processing machines may be used with programs written to implement the required methods or facilities; or it may be more effective, convenient and/or cost-effective to construct a specialized apparatus or system to perform the required methods or facilities.

Further, the sequences of events described in FIGS. 5-7 are exemplary and not intended to be limiting. Thus, other method steps may be used, and the order of certain events may vary without departing from the scope of the claimed invention. Moreover, particular steps may not be present and additional steps may be implemented in FIGS. 5-7. Also, the processes described herein are not inherently related to any particular apparatus and may be implemented by any suitable combination of components.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A method comprising:
   receiving over a network at a receiver network terminal a notification of a video message stored at a caller network terminal in a computer-readable medium, the notification including an identifier of the caller network terminal originating and storing the video message;
   retrieving the video message stored at the caller network terminal based on the identifier of the receiver network terminal; and
   presenting the video message using a display connected to the receiver network terminal.

2. The method of claim 1, wherein retrieving the video message includes sending a request over the network to the caller network terminal to access the video message and receiving a transmission of the video message from the caller network terminal over the network.

3. The method of claim 1, wherein retrieving the video message includes:
   transmitting a request to retrieve the video message from the receiver network terminal to the caller network terminal over the network;
   establishing a communication link between the caller network terminal and the receiver network terminal; and
   receiving a transmission of the video message at the receiver network terminal.

4. The method of claim 3, wherein receiving the video message includes:
   receiving a transmission of the video message in one of streaming of the video message to the receiver network terminal and storage of the entire video message at the receiver network terminal.

5. The method of claim 1, wherein the identifier of the receiver network terminal is at least one of a telephone number, a network address and a uniform resource locator.

6. A method comprising:
   receiving a video message at a caller network terminal;
   storing the video message in a computer-readable medium at the caller network terminal;
   providing a notification of the stored video message to a network server over a network connected to the caller network terminal and network server;
   receiving a request to access the stored video message from a receiver network terminal;
   establishing a communication link between the caller network terminal and the receiver network terminal; and
   transmitting the video message from the caller network terminal to the receiver network terminal.

7. The method of claim 6, wherein prior to the step of receiving a video message, the method further comprises:
   attempting to connect a call from the caller network terminal to a receiver network terminal; and
   determining whether the call is accepted by the receiver network terminal.

8. The method of claim 6, further comprising:
   transmitting the video message to the network server over the network.

9. The method of claim 6, wherein transmitting the video message comprises:
   transmitting the video message to the receiver network terminal by one of streaming of the video message to the receiver network terminal and transmitting of the entire video message as a storable file to the receiver network terminal.

10. The method of claim 6, wherein the identifier of the caller network terminal is at least one of a telephone number, a network address and a uniform resource locator.

11. A system comprising:
    a data storage system, the data storage system storing a video messaging database and video messaging instructions;
    a processor communicatively connected to the data storage system to access the video messaging database and the video messaging instructions;
    a network interface communicatively connected to the processor and configured to allow communications over a connected network;
    wherein the video messaging instructions are configured to cause the processor to:
    receive a first notification from a calling network terminal over the network via the network interface, the first notification containing video message information associated with a video message for a receiver network terminal and an identifier of the receiver network terminal,
    store the video message information in a portion of the video messaging database associated with the receiver network terminal,
    transmit a second notification to the receiver network terminal over the network via the network interface, the second notification including the video message information and an identifier of the calling network terminal.

12. The system of claim 11, wherein the video messaging instructions are further configured to cause the processor to:
   receive the video message from the calling network terminal, and
   store the video message in the portion of the video messaging database associated with the receiver network terminal.

13. The system of claim 12, wherein the video messaging instructions are further configured to cause the processor to:
   receive a request for the video message from the receiver network terminal via the network interface;
   retrieve the video message from the video message database;
   establish a communication link with the receiver network terminal; and
   transmit the video message to the receiver network terminal via the network interface.

14. The system of claim 13, wherein the video messaging instructions are further configured to cause the processor to transmit the video message to the receiver network terminal by one of streaming of the video message to the receiver network terminal and transmitting of the entire video message as a storable file to the receiver network terminal.

15. The system of claim 11, wherein the second notification includes an identifier of the caller network terminal.

16. The system of claim 11, wherein the identifier of the receiver network terminal is at least one of a telephone number, a network address and a uniform resource locator.

17. A method comprising:
   receiving a first notification from a calling network terminal over a network, the first notification containing video message information associated with a video message for a receiver network terminal and an identifier of the receiver network terminal, the video message recorded and stored at the calling network terminal;
   storing the video message information in a portion of a video messaging database associated with the receiver network terminal; and
   transmitting a second notification to the receiver network terminal over the network, the second notification including the video message information.

18. The method of claim 17, further comprising:
   receiving the video message from the calling network terminal; and
   storing the video message in the portion of the video messaging database associated with the receiver network terminal.

19. The method of claim 18, further comprising:
   receiving a request for the video message from the receiver network terminal;
   retrieving the video message from the video message database; and
   transmitting the video message to the receiver network terminal.

20. The system of claim 19, wherein transmitting the video message to the receiver network terminal is by one of streaming of the video message to the receiver network terminal and transmitting of the entire video message as a storable file to the receiver network terminal.

21. The system of claim 17, wherein the second notification includes an identifier of the caller network terminal.

22. The system of claim 17, wherein the identifier of the receiver network terminal is at least one of a telephone number, a network address and a uniform resource locator.

* * * * *